US010661620B2

(12) United States Patent
Wilkinson

(10) Patent No.: US 10,661,620 B2
(45) Date of Patent: May 26, 2020

(54) HEATED CAR TIRES

(71) Applicant: Christopher Wilkinson, Brooklyn, NY (US)

(72) Inventor: Christopher Wilkinson, Brooklyn, NY (US)

( * ) Notice: Subject to any disclaimer, the term of this patent is extended or adjusted under 35 U.S.C. 154(b) by 334 days.

(21) Appl. No.: 15/370,354

(22) Filed: Dec. 6, 2016

(65) Prior Publication Data
US 2017/0158004 A1    Jun. 8, 2017

Related U.S. Application Data

(60) Provisional application No. 62/263,785, filed on Dec. 7, 2015.

(51) Int. Cl.
*B60C 23/00* (2006.01)
*B60C 23/20* (2006.01)
*H05B 3/28* (2006.01)
*H05B 3/34* (2006.01)
*B60C 99/00* (2006.01)

(52) U.S. Cl.
CPC ............ *B60C 99/003* (2013.01); *B60C 23/00* (2013.01); *B60C 23/20* (2013.01); *H05B 3/28* (2013.01); *H05B 3/34* (2013.01)

(58) Field of Classification Search
None
See application file for complete search history.

(56) References Cited

U.S. PATENT DOCUMENTS

| 4,708,608 A | 11/1987 | DiRocco | |
|---|---|---|---|
| 6,350,963 B1 * | 2/2002 | Gray | B60C 9/20 152/151 |
| 8,714,869 B1 * | 5/2014 | Ries | E01C 19/27 219/202 |
| 9,586,449 B2 * | 3/2017 | Love | B60R 1/002 |
| 2009/0314407 A1 * | 12/2009 | Browne | B29D 30/0061 152/527 |
| 2014/0069558 A1 * | 3/2014 | Favia | B60C 99/003 152/152.1 |

(Continued)

FOREIGN PATENT DOCUMENTS

| DE | 102008053146 A1 * | 4/2010 | ............. H05B 3/342 |
|---|---|---|---|
| DE | 102010048328 A1 * | 4/2012 | ............. B60C 23/20 |

(Continued)

OTHER PUBLICATIONS

International Search Report and Written Opinion corresponding to PCT/US16/65277 dated Feb. 21, 2017, 6 pages.
Machine Translation of Abstract for JPH 10309913A.

*Primary Examiner* — Joseph M Pelham
(74) *Attorney, Agent, or Firm* — Gearart Law LLC

(57) ABSTRACT

A computerized tire heating system is provided for. The system features a carcass with a tread, a sidewall and a bead, an inner tube having an inner volume, a first layer of thermal insulation, connected to said bead, a second later of thermal insulation, connected to said tread, a power source, and a heating system having more than one heating coil located in between the first layer of thermal insulation and the second layer of thermal insulation, where the heating system is connected to said power source. The computerized tire heating system may also have a heating gel located in the inner volume of the inner tube.

17 Claims, 4 Drawing Sheets

(56) References Cited

U.S. PATENT DOCUMENTS

2015/0158354 A1    6/2015  Lin et al.

FOREIGN PATENT DOCUMENTS

| GB | 2511651 A | * | 9/2014 | ........... B60C 99/003 |
| GB | 2511651 A |   | 11/2014 | |
| JP | 10309913 A |   | 11/1998 | |
| JP | 2010143534 A | * | 7/2010 | |
| WO | WO-2009004585 A1 | * | 1/2009 | ............. H05B 3/342 |
| WO | WO-2017116238 A1 | * | 7/2017 | ............... H05B 3/34 |

* cited by examiner

HEATED CAR TIRES

CLAIM OF PRIORITY

This application claims the priority of U.S. Ser. No. 62/263,785 filed on Dec. 7, 2015, the contents of which are fully incorporated herein by reference.

FIELD OF THE EMBODIMENTS

The invention and its embodiments relate to a system for a heated car tire. In particular, a heated car tire that will melt snow in contact with, or near said tire.

BACKGROUND OF THE EMBODIMENTS

Anyone who lives in an area where it snows knows of the trouble of getting one's car out of the snow so that it may be used. Whether a user's car is left outside for a single storm, multiple storms, the user merely has the bad luck of being "plowed-in," snow can have meaningful effects on the speed with which someone can access and utilize their car. Further, if a user is driving an automobile during a snowstorm or on roads that have not been cleared since the past snowstorm, snow will accumulate in and on the treads of the tires. As maintain contact with the road is the primary function of tires, having a snow intermediary can seriously jeopardize the safety of operating the vehicle.

Further, in addition to accumulation of snow or ice on the tires, the combination of snow and ice may accumulate in between the spokes of a wheel. This problem is surprisingly common, and can cause the entire car to shake, or can stop the wheels from rotating all together.

However, existing tires provide limited or no mechanisms for addressing these situations. As such, there is a need for a tire that is capable of melting snow that has accumulated on or near a car's tire.

Review of related technology:

U.S. Pat. No. 6,350,963 pertains to a heated tire for melting snow and ice that contacts a vehicle's tire tread. The heated tire includes a vehicle tire that has a heating apparatus integrally formed within the tire between the tire tread and the outermost steel belt and is automatically activated by a control unit interlinked to a temperature sensor.

U.S. Patent Publication No.: 2009/0314407 pertains to a system for and method of reducing the rolling resistance of a tire by pre-heating the tire prior to use.

U.S. Patent Publication No.: 2010/0187212 pertains to a tire warmer, in particular for tires to be used in motor-cycling and motor-racing, which comprises a body wrappable to the wheel, at the tire, and seating a resistor for heating the tire. Such resistor is connected to electrical supply means actuable by a control device connected to a temperature sensor associable to the tread of the tire. Moreover, the tire warmer comprises a regulating device of the pressure of gas contained by the tire.

U.S. Pat. No. 2,475,199 pertains to an electrically conducing pneumatic tire.

U.S. Patent Publication No.: 2014/0069558 pertains to a tire defrosting system includes a tire having steel belts and a tire tread covering the steel belts, and a power source electrically connected to said steel belts of said tire. The power source provides electrical current to the steel belts so as to heat and increase the temperature thereof and in turn the tire tread so as to melt an accumulation of snow or ice on the tire thread. The power source, such as a car battery, is electrically connected to the steel belts by a pair of wire conductors. The tire includes a thermometer to monitor the internal temperature thereof and to provide an automatic shutdown mechanism.

U.S. Patent Publication No.: 2015/0174969 pertains to a tire which contains a pathway for transferring heat within a tire comprised of a heat transfer rubber conduit composed of at least one operational, physically functional, heat conductive tire component. In one embodiment, for a cured rubber tire, the heat transfer rubber conduit is provided as a pathway for transfer of heat generated within the tire to an external surface of the tire for dissipation of the conducted heat. In another embodiment, for an uncured rubber tire, the heat transfer rubber conduit is provided as a pathway to transfer heat applied to an outer surface of the tire to the interior of the tire. The heat conductive tire component(s) of the heat transfer conduit is/are each comprised of a heat conductive rubber composition containing acetylene carbon black. In one embodiment, the heat transfer rubber conduit is provided as a pathway for conduction of heat to or from a less heat conductive rubber component which adjoins at least one of such heat conductive rubber components.

Various devices are known in the art. However, their structure and means of operation are substantially different from the present invention. Such devices fail to provide a device that is integrated, controlled electronically by a computer, and will generate heat while in use. At least one embodiment of this invention is presented in the drawings below, and will be described in more detail herein.

SUMMARY OF THE EMBODIMENTS

The present invention provides for a computerized tire heating system, comprising: a carcass, comprising: a tread, a sidewall, connected to said tread, and a bead, connected to said sidewall; an inner tube having an inner volume, located inside said carcass; a first layer of thermal insulation, connected to said bead; a second later of thermal insulation, connected to said tread; a power source; a heating system, comprising: a plurality of heating coils disposed in between said first layer of thermal insulation and said second layer of thermal insulation and connected to said power source, a heating gel disposed inside said sinner volume. In alternative embodiments, the first layer of thermal insulation and the second layer of thermal insulation are constructed out of a flame-retardant rubber silicone material. In some embodiments, the heating gel is comprised of silicone, while in other embodiments the power source is located in an attached automobile, and in further embodiments the power source is integrated into said heating system. Preferably, the present invention can radiate temperatures of up to 300° C. while in use and is capable of melting snow that comes in contact with said carcass, and snow that is proximate to said system.

In various embodiments, said first layer of thermal insulation and said second layer of thermal insulation are constructed out of the same materials or different materials. In a preferred embodiment, the heating gel of the present invention is activated by air. Preferably, said heating gel comprises: iron, charcoal, salt, sawdust, and vermiculite. In some embodiments, said heating gel generates heat due to the friction of said heating gel interacting with said inner volume and said heating element may be constructed out of materials selected from the group consisting essentially of: Nichrome, Kanthal, Copronickel, etched foil, copper, iron, incoloy, and gold. Alternatively, said heating element is constructed out of the group consisting essentially of: Molybdenum disilicide, barium titanate, and lead titanate.

Further, said heating element may be constructed out of an amount of polydimethylsiloxane dosed with carbon nanoparticles. Preferably, the system also incorporated a thermometer, more preferably a digital thermometer.

It is an object of the present invention to prevent automobiles from being stuck in snow.

It is an object of the present invention to provide a superior automobile.

It is an object of the present invention to provide a means for a user to travel in snow-laden places.

It is an object of the present invention to assist a motor-vehicle operator in arriving at their destination safely.

It is an object of the present invention to allow the wheel of a car to melt snow.

DESCRIPTION OF THE PREFERRED EMBODIMENTS

Figure 1:
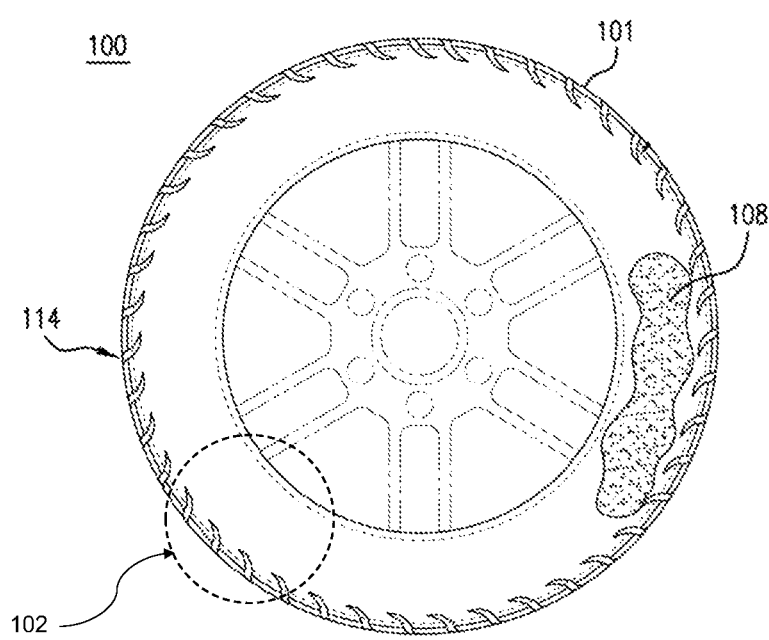
FIG. 1 shows a side view of an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

While this disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

Figure 2:
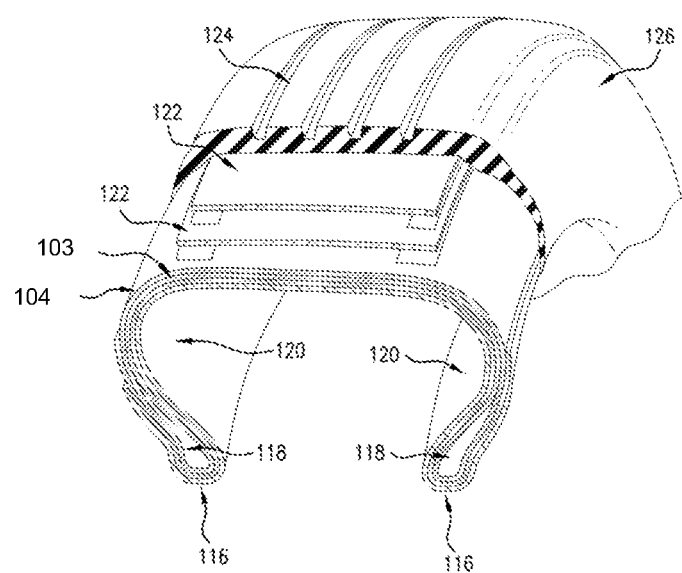
FIG. 2 shows a cross-sectional side view of an embodiment of the present invention and FIG. 3 shows a cross-sectional view of a second embodiment of the present invention.

FIG. 1 shows a side view of an embodiment of the present invention. FIG. 2 shows a cross-sectional side view of an embodiment of the present invention. As known in the art, a standard tire carcass 101 may include: a tread 114, grooves 124 located between the tread 114, a sidewall 126, a bead 116, and bead filler 118 located within the bead 116. Inside of the standard tire carcass 101 is an inner tube 102. Moreover, the inner tube 102 of the standard tire carcass 101 may comprise an inner liner 120. The standard tire carcass 101 may also include body piles 122, which run perpendicular to the tread 114. In a preferred embodiment of the invention, the inner tube 102 of the computerized tire heating system is filled with heating gel 108. Preferably, the carcass 101 is constructed out of a rubber silicone material with a flame retardant compound incorporated into its molecular structure. In some preferred embodiments, heating gel 108 is activated by air, and may be constructed out of iron, charcoal, salt, sawdust, vermiculite, or some combination thereof. Alternatively, the heating gel 108 may generate heat due to the friction of said heating gel interacting with said inner volume. Alternatively, the heating gel 108 may be comprised of two volumes of molecules that generate heat when mixed together. Preferably, the heating gel 108 will be a silicone-based compound that will automatically heat up from heat generated by the undercarriage of a car. This heat is used to melt snow in contact with or proximate to the present invention.

Figure 3:
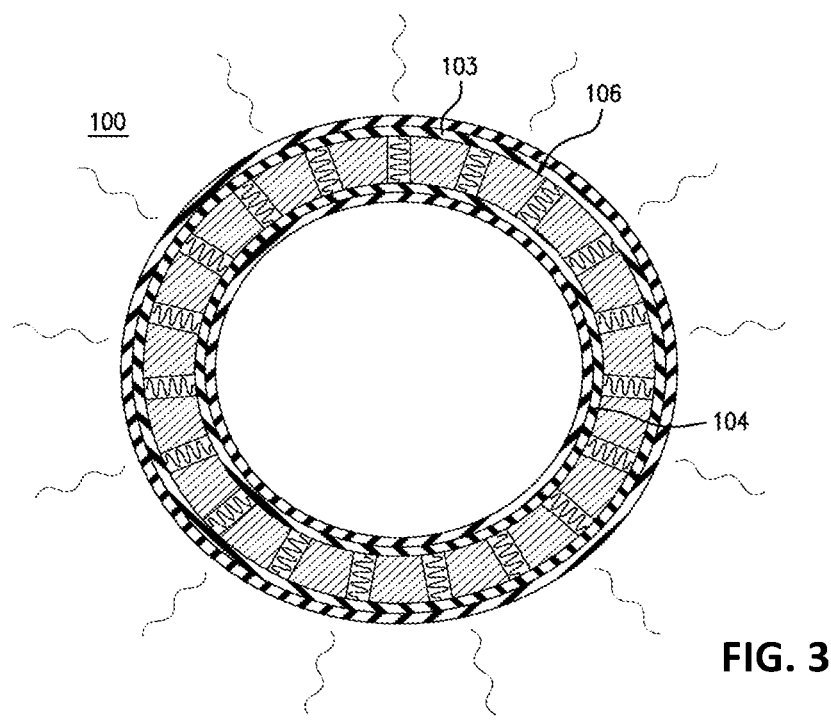

Referring to FIG. 2 and FIG. 3, a cross-sectional side view of a first embodiment and a cross-sectional view of a second embodiment of the present invention are provided, respectively. Here, computerized tire heating system 100 features a first layer of thermal insulation 103, a second layer of thermal insulation 104, and a heating system 106. As depicted in FIG. 2, the first layer of thermal insulation 103 is connected to the bead 116 and the second layer of thermal insulation 104 is connected to the tread 114. In some embodiments, the first layer of thermal insulation 103 and the second layer of thermal insulation 104 are constructed out of the same materials. In other embodiments, the first layer of thermal insulation 103 and the second layer of thermal insulation 104 are constructed out of different materials. The heating system 106, in many embodiments, operates via an electric current through a metal to generate heat. Non-limiting examples of these metals are Nichrome, Kanthal, Copronickel, etached foil, copper, iron, incoloy, and gold. Alternatively, the heating system 106 may be constructed out of a ceramic such as Molybdenum disilicide, barium titanate, and lead titanate. Further, the heating system 106 may be constructed out of an amount of polydimethylsiloxane dosed with carbon nanoparticles.

Figure 4:
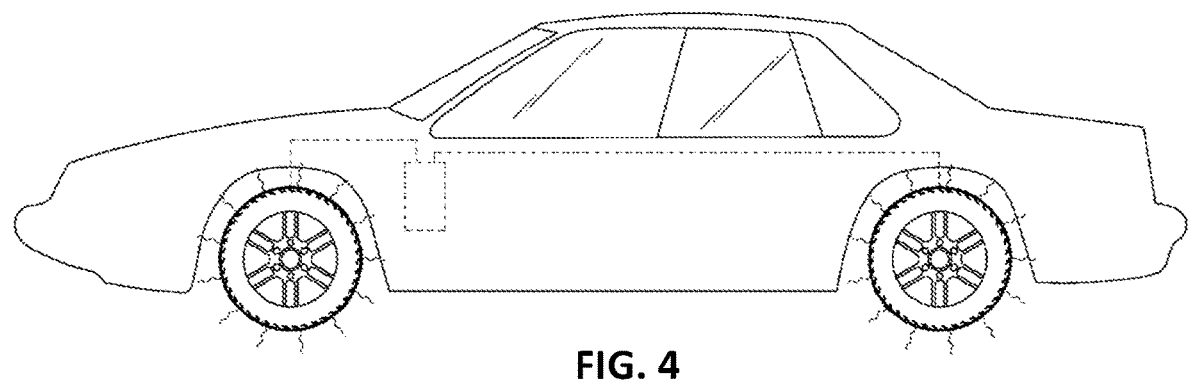
FIG. 4 shows an embodiment of the present invention, equipped on a standard automobile.

FIG. 4 shows an embodiment of the present invention, equipped on a standard automobile.

In many embodiments, the present invention utilizes a power source which may be integrated into the heating system of the present invention, or may be part of an attached automobile. In one preferred embodiment, the present invention is capable of radiating heat that corresponds to 300° C. Further, many embodiments of the present invention comprise a digital and/or an analog thermometer. In another preferred embodiment, the present invention features a computerized feature which comprises a downloadable software application which is connected to an automobile's computer diagnostic system. This would allow a user to view the temperature being radiated by the present invention on, for example, their dashboard. The software application will feature a menu desktop which is capable of controlling the temperature of the heating gel. Preferably, this gel will cover the entire inner circumference of the wheel, allowing even heat distribution to melt any proximate snow or ice.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Therefore, it is intended that the disclosure not be limited to the particular embodiments disclosed.

What is claimed is:

1. A computerized tire heating system, comprising:
   a carcass, comprising: a tread, a sidewall connected to said tread, and a bead connected to said sidewall;

an inner tube having an inner volume located inside said carcass;
a first layer of thermal insulation connected to said bead;
a second later of thermal insulation connected to said tread;
a power source; and
a heating system comprising:
  a plurality of heating coils disposed in between said first layer of thermal insulation and said second layer of thermal insulation and connected to said power source; and
  a heating gel disposed inside said inner volume.

2. The computerized tire heating system of claim 1, wherein said first layer of thermal insulation and said second layer of thermal insulation are constructed out of a flame-retardant rubber silicone material.

3. The computerized tire heating system of claim 1, wherein said heating gel is comprised of silicone.

4. The computerized tire heating system of claim 1, wherein said power source is located in an attached automobile.

5. The computerized tire heating system of claim 1, wherein said power source is integrated into said heating system.

6. The computerized tire heating system of claim 1, wherein said system can radiate temperatures of up to 300° C. while in use.

7. The computerized tire heating system of claim 1, wherein said computerized tire heating system is capable of melting snow that comes in contact with said carcass.

8. The computerized tire heating system of claim 1, wherein said computerized tire heating system is capable of melting snow proximate to said system.

9. The computerized tire heating system of claim 1, wherein said first layer of thermal insulation and said second layer of thermal insulation are constructed out of the same materials.

10. The computerized tire heating system of claim 1, wherein said first layer of thermal insulation and said second layer of thermal insulation are constructed out of different materials.

11. The computerized tire heating system of claim 1, wherein said heating gel is activated by air.

12. The computerized tire heating system of claim 11, wherein said heating gel comprises: iron, charcoal, salt, sawdust, and vermiculite.

13. The computerized tire heating system of claim 1, wherein said heating gel generates heat due to the friction of said heating gel interacting with said inner volume.

14. The computerized tire heating system of claim 1, wherein said heating element is constructed out of materials selected from the group consisting essentially of: Nichrome, Kanthal, Copronickel, etached foil, copper, iron, incoloy, and gold.

15. The computerized tire heating system of claim 1, wherein said heating element is constructed out of the group consisting essentially of: Molybdenum disilicide, barium titanate, and lead titanate.

16. The computerized tire heating system of claim 1, wherein said heating element is constructed out of an amount of polydimethylsiloxane dosed with carbon nanoparticles.

17. The computerized tire heating system of claim 1, further comprising a thermometer.

* * * * *